No. 734,133. PATENTED JULY 21, 1903.
A. B. PORTER.
APPARATUS FOR PRODUCING COLORED LIGHT EFFECTS.
APPLICATION FILED FEB. 21, 1902.
NO MODEL.
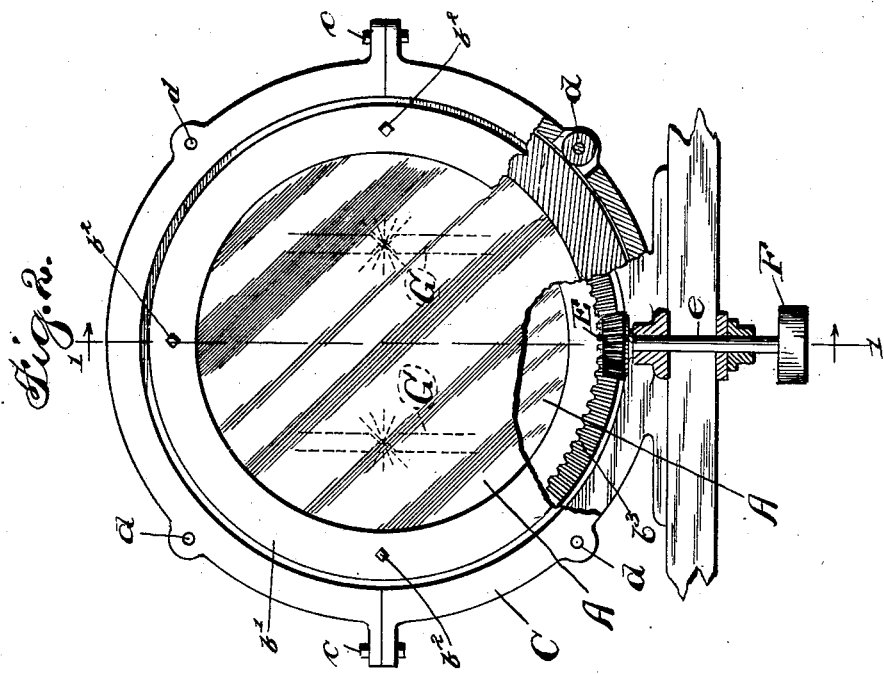
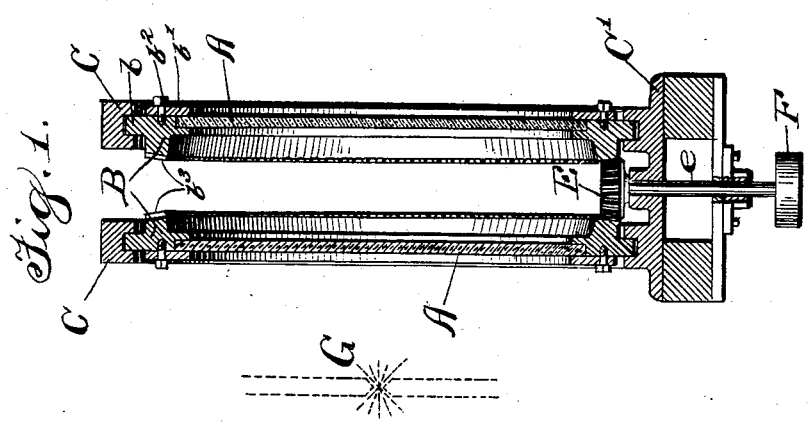
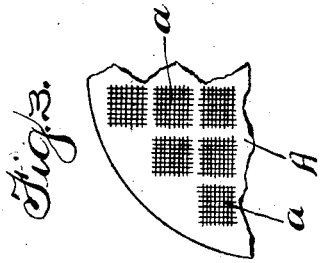
Witnesses:
J B Weir
Inventor.
A. B. Porter No. 734,133.

Patented July 21, 1903.

UNITED STATES PATENT OFFICE.

ALBERT B. PORTER, OF EVANSTON, ILLINOIS.

APPARATUS FOR PRODUCING COLORED-LIGHT EFFECTS.

SPECIFICATION forming part of Letters Patent No. 734,133, dated July 21, 1903.

Application filed February 21, 1902. Serial No. 95,136. (No model.)

*To all whom it may concern:*

Be it known that I, ALBERT B. PORTER, a citizen of the United States, residing in Evanston, in the county of Cook and State of Illinois, have invented certain new and useful Improvements in Apparatus for Producing Colored-Light Effects, of which the following is a specification.

The object of the invention is the utilization of the well-known diffraction-grating in the production of colored-light effects for amusement or display purposes as a means of attracting the attention of by-passers to show-cases and show-windows, for example; and to this end the invention contemplates an apparatus in which one or more such diffraction-gratings are mounted to revolve in front of one or more arc or other lights or lamps, so as to produce to the eyes of observers who see the lights through the gratings a varying play of spectrum colors. In its simpler form the apparatus may be provided with a single grating, preferably ruled with a number of intersecting sets of parallel lines, the effect of which will be to produce an appearance of colored beams radiating from each lamp or source of light behind the grating and apparently rotating together about the light as a center, like the spokes of a wheel about its axle. In the further development of the invention a pair of gratings may be mounted one behind the other and relatively rotated, so as to cause the appearance of two separately-rotating sets of particolored beams centering about each lamp or source of light provided. Preferably the two gratings of such a pair will be rotated in opposite directions, so as to give an opposite rotation to the beams of each two concentric sets, and conveniently a single rotary driving part will in this case be interposed between the gratings to impart opposite rotary movement to the latter by the engagement therewith of the opposite sides of such common driving part; but it will also be understood that so long as there is a relative rotation of the gratings the direction of their actual rotary movements need not necessarily be opposite, although that relation is believed to be most desirable, and it will also be understood that any plurality of relatively rotating gratings, as well as a single pair of gratings, is equally comprehended within the invention and that, in fact, the complication of the resulting color effects will be in like proportion to the number of gratings employed.

In the accompanying drawings, illustrative of one form of apparatus in which my improvements may be practically embodied, Figure 1 is a central vertical section taken on line 1 1 of Fig. 2. Fig. 2 is a front elevation thereof. Fig. 3 is a fragmentary detail indicating the character of grating preferably employed.

Referring to the figures, A and A' designate ruled screens or refractive gratings arranged one behind the other and provided with a circular protecting-rim B. These rims are revolubly mounted in annular frames C, that are preferably supported upon a common base C', so as to be held in fixed relation with each other. An internal groove in each frame C receives an annular outer flange $b$ of the inclosed rim B and centers the grating within the frame without interfering with its free rotary movement, bearing-rollers $d$ being also herein shown as provided in each frame at several points on its circumference to engage the periphery of the inclosed rim, and so support it without undue friction. To permit of the rims and gratings being inserted within the frame C, the latter are herein shown as divided diametrically into separate sections that are normally clamped together by bolts $c$, while the glass itself is set within a counterbored seat in each rim and secured there by a laterally-removable rim $b'$, that is fastened to the rim by bolts $b^2$.

Any suitable driving mechanism may be provided for giving to the two gratings their relative rotary movement; but as a further improvement such means is herein shown as provided in the form of a single beveled pinion E, which is interposed between the rims B and made of just the right pitch-diameter to intermesh on its opposite sides with annular gear-toothed surfaces $b^3$ on the rims B. The shaft $e$ of the pinion E may be led off radially in any desired direction, but is herein shown as extended down through the base C' of the frames C and as provided on its lower end with a driving-pulley F, by means of which or by any other suitable means a belted or other connection may be made with a driving-motor of any desired sort or variety. Behind the gratings thus provided there will be located any convenient number of electric-arc or other lights or lamps G, the rays from which will be projected through the gratings, and thereby made to exhibit a marvelous variety of colored effects. These effects will be especially noticeable if the gratings be ruled with a plurality of intersecting sets of parallel lines, in which case each lamp or source of light seen through the grating will appear to be surrounded by a double set of spectrum-colored beams radiating from the light as a center, and if the motor be now applied to turn the driving-shaft and rotate the gratings as intended the two sets of concentric beams for each light will appear to be rotating in opposite directions, like the spokes of a pair of wheels mounted adjacently upon a common axle and given different directions of turning movement.

The gratings employed in apparatus of this character may advantageously be produced photographically by the process set forth in my application filed February 15, 1902, for improvements in diffraction - gratings and methods of producing the same photographically, Serial No. 94,271, and, as hereinbefore stated, the complication of design and brilliancy of the color effects will be increased up to a certain limit by providing such gratings with a considerable number of sets of lines intersecting each other at different angles, gratings comprised of from four to sixteen sets of crossed lines being in practice found most effective for the purposes of this invention, and in case the area of the gratings A desired for this apparatus is larger than can be practicably ruled on a dividing-engine or than any single grating photographically printed from a plate so ruled the desired effect may nevertheless be obtained by photographically printing a small grating in different spots $a$ over the area of the large plate A until the surface of the latter is practically covered thereby, as indicated in Fig. 3.

It will be understood that in the simpler forms of the apparatus the driving mechanism may be dispensed with and the rotary movement imparted to the gratings by the hand instead, this being especially practicable where the device is designed for use as a toy. It will also be obvious that the mechanical mounting as a whole may be otherwise widely varied from the form particularly here shown without departure from the broad spirit of the invention claimed.

I claim as my invention—

1. An apparatus for producing colored-light effects consisting of a rotatably-mounted transparent plate provided on its surface with diffraction-rulings, substantially as described.

2. In an apparatus of the character described, a plurality of transparent plates mounted to rotate relatively to each other, and provided on their surfaces with diffraction-rulings, substantially as described.

3. In an apparatus of the character described, the combination of a rotatably-mounted diffraction-grating, and lights arranged in proximity to, but out of the plane of the grating, substantially as described.

4. In an apparatus of the character described, a plurality of diffraction-gratings mounted one in front of the other and relatively rotatable, and lights arranged in proximity to, but out of the planes of the gratings, substantially as described.

5. The combination with a pair of diffraction-gratings provided with gear-toothed rims, of frames within which the rims are rotatably mounted, and a driving-pinion interposed between the rims and engaging both gear-toothed surfaces thereof, substantially as described.

6. An apparatus for producing colored-light effects, consisting of a rotatably-mounted diffraction-grating provided with a plurality of intersecting sets of parallel lines, substantially as described.

7. In an apparatus of the character described, a rotatably-mounted diffraction-grating having its diffracting-surface composed of a plurality of spots of parallel rulings, substantially as described.

8. The combination of a plurality of diffraction-gratings mounted one in front of the other and relatively rotatable, the diffracting-surfaces being composed of a plurality of spots of parallel rulings, substantially as described.

9. In an apparatus of the character described, a rotatably-mounted diffraction-grating having its diffracting-surface composed of a plurality of spots of intersecting sets of parallel lines, substantially as described.

In testimony that I claim the foregoing as my invention I affix my signature, in presence of two subscribing witnesses, this 8th day of February, A. D. 1902.

ALBERT B. PORTER.

Witnesses:
HENRY W. CARTER,
K. A. COSTELLO.